(12) United States Patent
Zaima et al.

(10) Patent No.: US 9,922,770 B2
(45) Date of Patent: Mar. 20, 2018

(54) THROUGH-TYPE MULTILAYER CERAMIC CAPACITOR

(71) Applicant: TAIYO YUDEN CO., LTD., Taito-ku, Tokyo (JP)

(72) Inventors: Tomohiko Zaima, Takasaki (JP); Shin Nakayasu, Takasaki (JP); Takashi Sasaki, Takasaki (JP); Fukio Kinoshita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 18 days.

(21) Appl. No.: 14/973,666

(22) Filed: Dec. 17, 2015

(65) Prior Publication Data
US 2016/0189867 A1    Jun. 30, 2016

(30) Foreign Application Priority Data

Dec. 26, 2014  (JP) ................................. 2014-265701
Oct. 15, 2015  (JP) ................................. 2015-203774

(51) Int. Cl.
*H01G 4/35*    (2006.01)
*H01G 4/30*    (2006.01)
(Continued)

(52) U.S. Cl.
CPC ............... *H01G 4/35* (2013.01); *H01G 4/012* (2013.01); *H01G 4/232* (2013.01); *H01G 4/30* (2013.01)

(58) Field of Classification Search
None
See application file for complete search history.

(56) References Cited

U.S. PATENT DOCUMENTS

2003/0011962 A1*  1/2003  Yamamoto ............... H01G 4/30
                                                 361/321.2
2009/0053853 A1*  2/2009  Onodera ............. H01G 4/2325
                                                 438/106
(Continued)

FOREIGN PATENT DOCUMENTS

JP    2000058376 A    2/2000
JP    2008294298 A    12/2008
(Continued)

OTHER PUBLICATIONS

A Notification of Reason for Refusal issued by Korean Intellectual Property Office, dated Sep. 13, 2016, for Korean counterpart application No. 1020150149306.

*Primary Examiner* — Dion R Ferguson
(74) *Attorney, Agent, or Firm* — Law Office of Katsuhiro Arai

(57) ABSTRACT

In an embodiment, a through-type multilayer ceramic capacitor 10-1 has a first external electrode 12 provided on one end of the capacitor body 11 in the length direction, and a second external electrode 13 provided on the other end of the capacitor body 11 in the length direction, and it also has a third external electrode 14 of quadrangular cylinder shape provided at the center of the capacitor body 11 in a manner continuously covering parts of both sides in the height direction, and parts of both sides in the width direction, of the capacitor body 11, in a state not contacting the first external electrode 12 and second external electrode 13. The through-type multilayer ceramic capacitor can offer improved strength at the time of installation on a circuit board.

17 Claims, 4 Drawing Sheets

(51) Int. Cl.
*H01G 4/012* (2006.01)
*H01G 4/232* (2006.01)

(56) References Cited

U.S. PATENT DOCUMENTS

| | | | | |
|---|---|---|---|---|
| 2009/0073634 A1* | 3/2009 | Lee | ............ | H01G 4/35 |
| | | | | 361/303 |
| 2009/0207550 A1* | 8/2009 | Feichtinger | ............... | H01G 4/30 |
| | | | | 361/301.4 |
| 2010/0033897 A1* | 2/2010 | Lee | ......... | H01G 4/012 |
| | | | | 361/329 |
| 2012/0188684 A1* | 7/2012 | Akazawa | ............... | H01G 4/012 |
| | | | | 361/321.2 |
| 2015/0014037 A1* | 1/2015 | Ahn | ........... | H01G 4/30 |
| | | | | 174/260 |
| 2015/0083477 A1* | 3/2015 | Lee | ......... | H01G 4/012 |
| | | | | 174/260 |
| 2015/0109718 A1* | 4/2015 | Choi | ........... | H01G 2/06 |
| | | | | 361/304 |

FOREIGN PATENT DOCUMENTS

| | | | |
|---|---|---|---|
| JP | 2014220527 A | 11/2014 | |
| KR | 101321836 B1 | 10/2013 | |

* cited by examiner

[Fig. 1]
Background Art
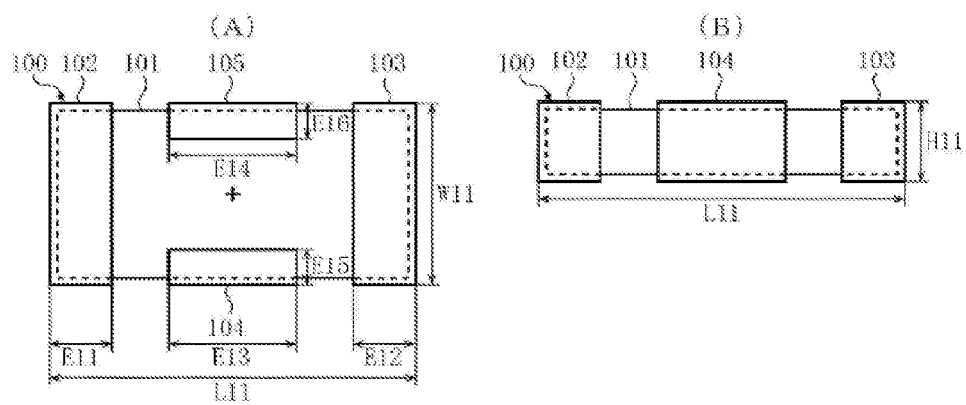
[Fig. 2]
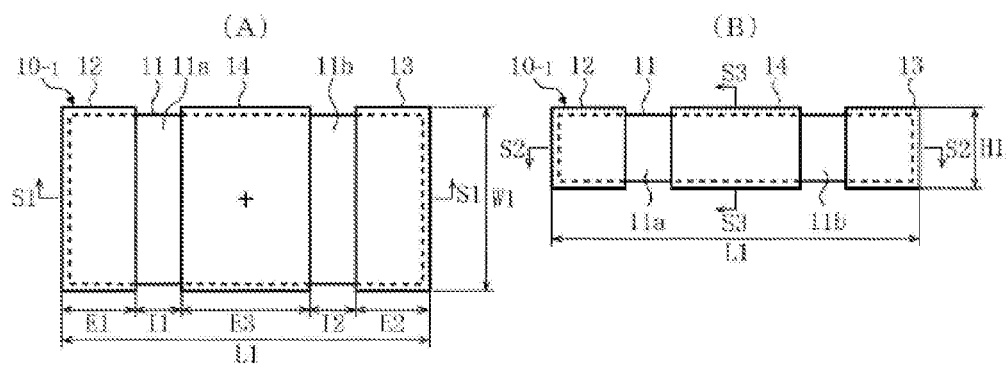
[Fig. 3]
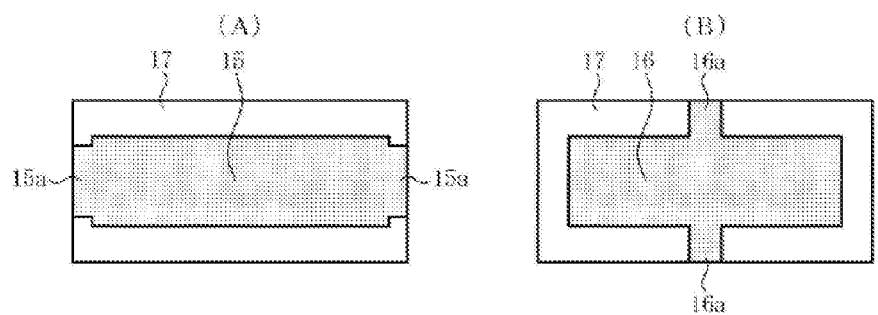

[Fig. 4]
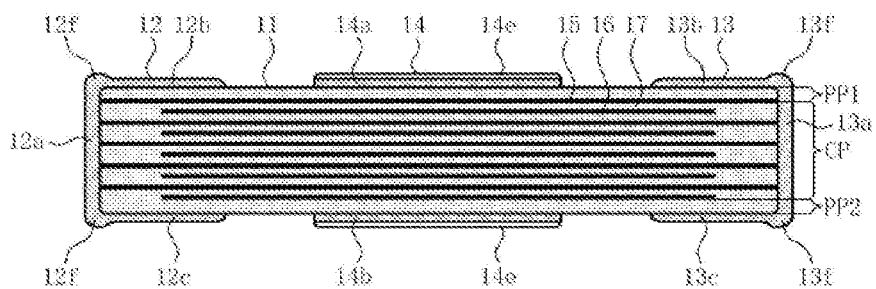
[Fig. 5]
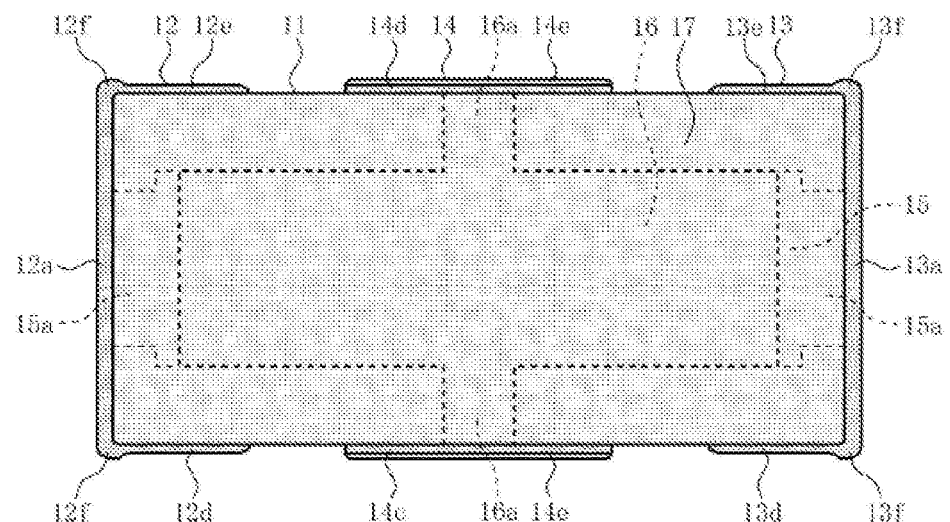
[Fig. 6]
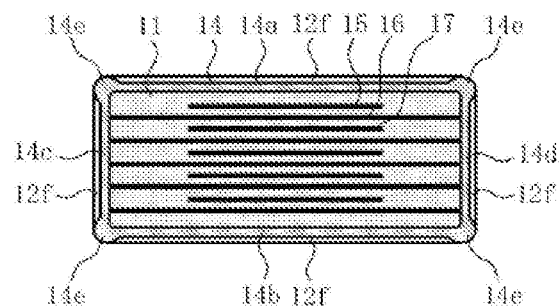

[Fig. 7]
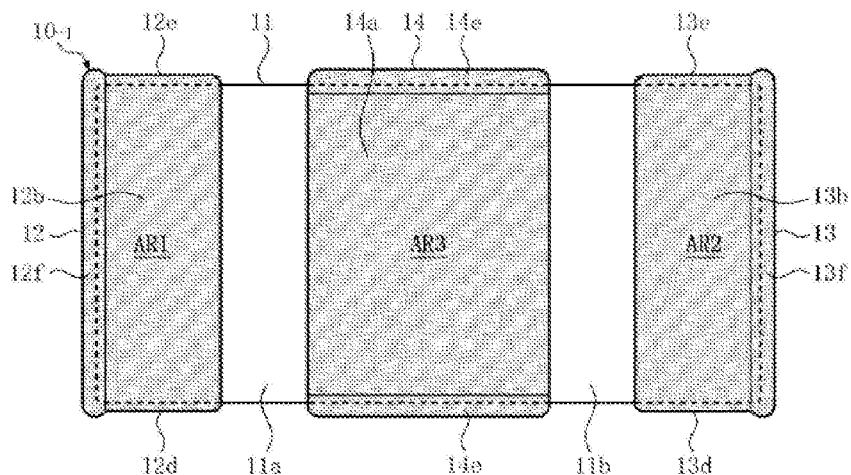
[Fig. 8]
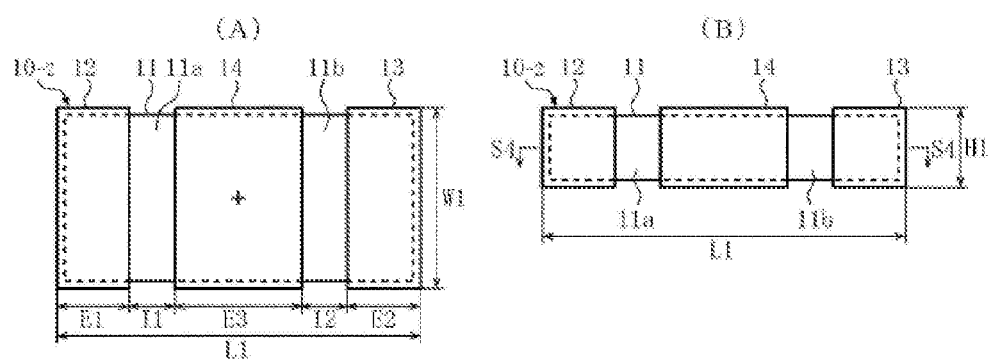
[Fig. 9]
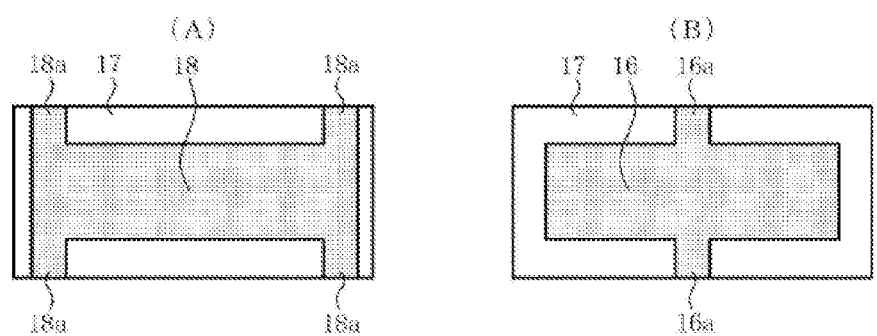

[Fig. 10]
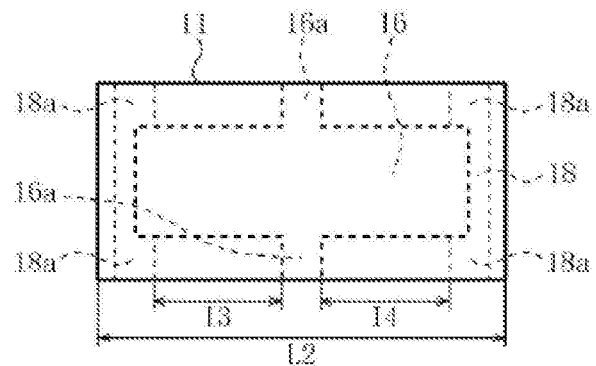
[Fig. 11]
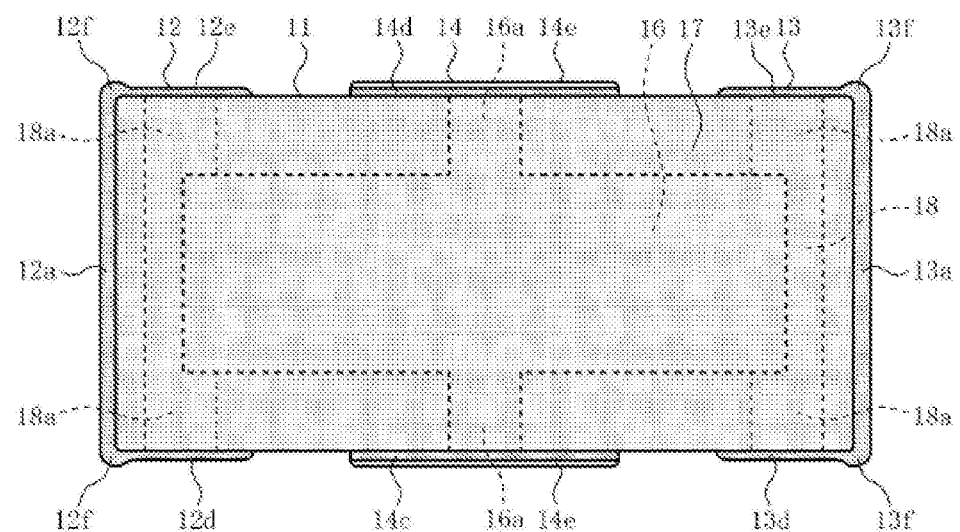
[Fig. 12]
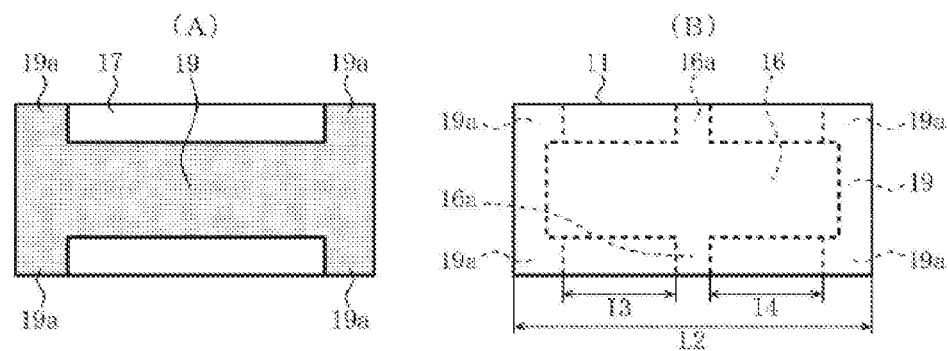

THROUGH-TYPE MULTILAYER CERAMIC CAPACITOR

BACKGROUND

Field of the Invention

The present invention relates to a through-type multilayer ceramic capacitor.

Description of the Related Art

In relation to the aforementioned through-type multilayer ceramic capacitor, Patent Literature 1 cited below discloses the through-type ceramic capacitor 100 (hereinafter simply referred to as "through-type capacitor 100") shown in FIG. 1.

This through-type capacitor 100 forms a roughly rectangular solid shape meeting the condition "length L11>width W11>height H11," and has: a capacitor body 101 of roughly rectangular solid shape specified by a length, width, and height that are slightly smaller than length L11, width W11, and height H11, respectively; a first external electrode 102 provided on one end of the capacitor body 101 in the length direction; a second external electrode 103 provided on the other end of the capacitor body 101 in the length direction; a third external electrode 104 provided roughly at the center of the capacitor body 101 on one end in the width direction; and a fourth external electrode 105 provided roughly at the center of the capacitor body 101 on the other end in the width direction.

Also provided in the capacitor body 101 is a capacitive part in which multiple first internal electrode layers (not illustrated) and multiple second internal electrode layers (not illustrated) are stacked together alternately in the height direction with dielectric layers (not illustrated) in between. One ends of the multiple first internal electrode layers are connected to the first external electrode 102 and the other ends are connected to the second external electrode 103, while one ends of the multiple second internal electrode layers are connected to the third external electrode 104 and the other ends are connected to the fourth external electrode 105.

Demand for size reduction and thickness reduction still persists in the field of through-type multilayer ceramic capacitors of this type, and particularly regarding thickness reduction, concerns remain as to the strength of the capacitor when it is installed on a circuit board. This is explained below using FIG. 1.

The conventional through-type capacitor 100 shown in FIG. 1 is generally picked up in a component feeding area by a pickup nozzle at or near the center of one side or the other side in the height direction (refer to the + mark in (A) in FIG. 1), after which the picked-up capacitor is transferred and then installed on a circuit board, such as a circuit board permitting surface mounting (component mounting board), circuit board permitting surface mounting and internal mounting (component embedding board), or the like.

However, since the conventional through-type capacitor 100 shown in FIG. 1 has a structure whereby a load is applied directly to the capacitor body 101 from the pickup nozzle at the time of the installation, there are concerns that this load may cause the capacitor body 101 to generate cracks. These cracks, no matter how large or small, allow moisture to enter the capacitor body 101, which increases the probability of the first internal electrode layers and second internal electrode layers corroding due to the moisture that has entered and thereby suffering capability deterioration, while it also increases the probability of the first internal electrode layers and second internal electrode layers shorting to one another to cause functional impairment.

[Patent Literature 1] Japanese Patent Laid-open No. 2008-294298

SUMMARY

An object of the present invention is to provide a through-type multilayer ceramic capacitor offering improved strength at the time of installation on a circuit board.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the through-type multilayer ceramic capacitor pertaining to the present invention is a through-type multilayer ceramic capacitor comprising a capacitor body of roughly rectangular solid shape specified by length, width, and height, as well as a capacitive part provided therein which is formed by multiple first internal electrode layers and multiple second internal electrode layers stacked together alternately in the height direction with dielectric layers in between, wherein such through-type multilayer ceramic capacitor further has: (1) a first external electrode provided on one end of the capacitor body in the length direction in a manner continuously covering one side in the length direction, parts of both sides in the height direction, and parts of both sides in the width direction, of the capacitor body, and to which one ends of the multiple first internal electrode layers in the length direction are connected; (2) a second external electrode provided on the other end of the capacitor body in the length direction in a manner continuously covering the other side in the length direction, parts of both sides in the height direction, and parts of both sides in the width direction, of the capacitor body, and to which the other ends of the multiple first internal electrode layers in the length direction are connected; and (3) a third external electrode of quadrangular cylinder shape provided at the center of the capacitor body in the length direction in a manner continuously covering parts of both sides in the height direction and parts of both sides in the width direction, of the capacitor body, in a state not contacting the first external electrode and second external electrode, where one ends of the multiple second internal electrode layers in the width direction are connected to one part, while the other ends of the multiple second internal electrode layers are connected to the other part, of the area covering parts of both sides in the width direction; and (4) lengths E1 and E3 meet the condition "E1<E3," while lengths E2 and E3 meet the condition "E2<E3," where E1 represents the length of the first external electrode along the length of the capacitor body, E2 represents the length of the second external electrode along the length of the capacitor body, and E3 represents the length of the third external electrode along the length of the capacitor body, as the through-type multilayer ceramic capacitor is viewed from the height direction.

According to the present invention, a through-type multilayer ceramic capacitor offering improved strength at the time of installation on a circuit board can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention.

Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

(A) in FIG. 1 is a drawing showing one side of a conventional through-type multilayer ceramic capacitor in the height direction, while (B) in FIG. 1 is a drawing showing one side of the same in the width direction.

(A) in FIG. 2 is a drawing showing one side of a through-type multilayer ceramic capacitor pertaining to the first embodiment of the present invention in the height direction, while (B) in FIG. 2 is a drawing showing one side of the same in the width direction.

(A) in FIG. 3 is a drawing showing the shape of a first internal electrode layer built into the capacitor body, while (B) in FIG. 3 is a drawing showing the shape of a second internal electrode layer built into the capacitor body.

FIG. 4 is an enlarged section view of (A) in FIG. 2, cut along line S1-S1.

FIG. 5 is an enlarged section view of (B) in FIG. 2, cut along line S2-S2.

FIG. 6 is an enlarged section view of (B) in FIG. 2, cut along line S3-S3.

FIG. 7 is an enlarged view of (A) in FIG. 2.

(A) in FIG. 8 is a drawing showing one side of a through-type multilayer ceramic capacitor pertaining to a second embodiment of the present invention in the height direction, while (B) in FIG. 8 is a drawing showing one side of the same in the width direction.

(A) in FIG. 9 is a drawing showing the shape of a first internal electrode layer built into the capacitor body, while (B) in FIG. 9 is a drawing showing the shape of a second internal electrode layer built into the capacitor body.

FIG. 10 is a drawing showing one side of the capacitor body in the height direction.

FIG. 11 is an enlarged section view of (B) in FIG. 8, cut along line S4-S4.

(A) in FIG. 12 is a drawing showing a shape variation example of the first internal electrode layer shown in (A) in FIG. 9, while (B) in FIG. 12 is a drawing corresponding to FIG. 10 showing one side of the capacitor body in the height direction wherein the first internal electrode layer shown in (A) in FIG. 12 is used instead of the first internal electrode layer shown in (A) in FIG. 9.

DESCRIPTION OF THE SYMBOLS 10-1—Through-type multilayer ceramic capacitor, 11—Capacitor body, 11a, 11b—Exposed part of the capacitor body, 12—First external electrode, 12a—Part of the first external electrode covering one side of the capacitor body in the length direction, 12b—Part of the first external electrode partially covering one side of the capacitor body in the height direction, 12c—Part of the first external electrode partially covering the other side of the capacitor body in the height direction, 12d—Part of the first external electrode partially covering one side of the capacitor body in the width direction, 12e—Part of the first external electrode partially covering the other side of the capacitor body in the width direction, 12f—Thick part of the first external electrode, 13—Second external electrode, 13a—Part of the second external electrode covering the other side of the capacitor body in the length direction, 13b—Part of the second external electrode partially covering one side of the capacitor body in the height direction, 13c—Part of the second external electrode partially covering the other side of the capacitor body in the height direction, 13d—Part of the second external electrode partially covering one side of the capacitor body in the width direction, 13e—Part of the second external electrode partially covering the other side of the capacitor body in the width direction, 13f—Thick part of the second external electrode, 14—Third external electrode, 14a—Part of the third external electrode partially covering one side of the capacitor body in the height direction, 14b—Part of the third external electrode partially covering the other side of the capacitor body in the height direction, 14c—Part of the third external electrode partially covering one side of the capacitor body in the width direction, 14d—Part of the third external electrode partially covering the other side of the capacitor body in the width direction, 14e—Thick part of the third external electrode, 15—First internal electrode layer, 15a—Leader part of the first internal electrode layer, 16—Second internal electrode layer, 16a—Leader part of the second internal electrode layer, 17—Dielectric layer, CP—Capacitive part, PP1—First protective part, PP2—Second protective part, 10-2—Through-type multilayer ceramic capacitor, 18—First internal electrode layer, 18a—Leader part of the first internal electrode layer, 19—First internal electrode layer, 19a—Leader part of the first internal electrode layer.

DETAILED DESCRIPTION OF EMBODIMENTS

<<First Embodiment>>

First, the structure, effects, etc., of a through-type multilayer ceramic capacitor 10-1 (hereinafter simply referred to as "through-type capacitor 10-1") pertaining to the first embodiment of the present invention are explained using FIG. 2 to FIG. 7. It should be noted that, while FIG. 4 and FIG. 6 depict five of the first internal electrode layers 15 described later and five of the second internal electrode layers 16 described later, this is due to the convenience of illustration and the number of first internal electrode layers 15 and number of second internal electrode layers 16 are not limited in any way.

As shown in (A) in FIG. 2 and (B) in FIG. 2, the through-type capacitor 10-1 forms a roughly rectangular solid meeting the condition "length L1>width W1>height H1," and has: a capacitor body 11 of roughly rectangular solid shape specified by a length, width, and height that are slightly smaller than length L1, width W1, and height H1, respectively; a first external electrode 12 provided on one end (left end in (A) in FIG. 2 and (B) in FIG. 2) of the capacitor body 11 in the length direction; a second external electrode 13 provided on the other end (right end in (A) in FIG. 2 and (B) in FIG. 2) of the capacitor body 11 in the length direction; and a third external electrode 14 of quadrangular cylinder shape provided at the center (lateral center in (A) in FIG. 2 and (B) in FIG. 2) of the capacitor body 11 in the length direction in a state not contacting the first external electrode 12 and second external electrode 13. In addition, of both sides in the height direction and both sides in the width direction, of the capacitor body 11, a part 11*a* between the first external electrode 12 and third external electrode 14, and a part 11*b* between the second external electrode 13 and third external electrode 14, are exposed (hereinafter referred to as "exposed part 11*a*" and "exposed part 11*b*"), respectively.

As shown in FIG. 4, the capacitor body 11 has a first protective part PP1 made of dielectrics, a capacitive part CP formed by multiple first internal electrode layers 15 and multiple second internal electrode layers 16 that are stacked together alternately in the height direction with dielectric layers 17 in between, and a second protective part PP2 made of dielectrics, all of which are arranged in layers in this order in the height direction. Each first internal electrode layer 15 has a roughly rectangular shape like the one shown in (A) in FIG. 3, and integrally has a narrow leader part 15*a* extending in the length direction at one end in the length direction (left end in (A) in FIG. 3) and also at the other end in the length direction (right end in (A) in FIG. 3). On the other hand, each second internal electrode layer 16 has a roughly rectangular shape like the one shown in (B) in FIG. 3, and integrally has a narrow leader part 16*a* extending in the width direction at one end in the width direction (bottom end in (B) in FIG. 3) and also at the other end in the width direction (top end in (B) in FIG. 3).

As is evident from FIG. 4 to FIG. 6, one end of each first internal electrode layer 15 in the length direction, or specifically the left edge of the left leader part 15*a* in (A) in FIG. 3, is electrically connected to a part 12*a*, as explained later, of the first external electrode 12, while the other end of each first internal electrode layer 15 in the length direction, or specifically the right edge of the right leader part 15*a* in (A) in FIG. 3, is electrically connected to a part 13*a*, as explained later, of the second external electrode 13. On the other hand, one end of each second internal electrode layer 16 in the width direction, or specifically the bottom edge of the bottom leader part 16*a* in (B) in FIG. 3, is electrically connected to a part 14*c*, as explained later, of the third external electrode 14, while the other end of each second internal electrode layer 16 in the width direction, or specifically the top edge of the top leader part 16*a* in (B) in FIG. 3, is electrically connected to a part 14*d*, as explained later, of the third external electrode 14.

It should be noted that the first protective part PP1, each dielectric layer 17, and second protective part PP2, are formed by dielectric ceramics whose composition is roughly the same and whose dielectric constant is also roughly the same, and the thickness of each dielectric layer 17 is roughly the same. For such dielectric ceramics, preferably dielectric ceramics whose primary component is barium titanate, strontium titanate, calcium titanate, magnesium titanate, calcium zirconate, calcium titanate zirconate, barium zirconate, titanium oxide, etc., or more preferably dielectric ceramics of $\in$>1000 or class 2 (high dielectric constant type), may be used. Here, the meaning of "dielectric ceramics whose composition is roughly the same and whose dielectric constant is also roughly the same" includes a case where the composition and dielectric constant are exactly the same, as well as a case where at least one of the composition and dielectric constant varies slightly within an allowable range due to the sintering level, etc., while the meaning of "thickness . . . is roughly the same" includes a case where the thickness is exactly the same, as well as a case where the thickness varies slightly within an allowable range or manufacturing tolerance due to the compression level at the time of stacking, etc.

In addition, each first internal electrode layer 15 and each second internal electrode layer 16 are formed by a good conductor whose composition is roughly the same, while the thickness of each first internal electrode layer 15 and each second internal electrode layer 16 is roughly the same. For such good conductor, preferably a good conductor whose primary component is nickel, copper, palladium, platinum, silver, gold, or alloy thereof, etc., may be used. Here, the meaning of "good conductor whose composition is roughly the same" includes a case where the composition is exactly the same, as well as a case where the composition varies slightly within an allowable range due to the sintering level, etc., while the meaning of "thickness . . . is roughly the same" includes a case where the thickness is exactly the same, as well as a case where the thickness varies slightly within an allowable range or manufacturing tolerance due to the compression level at the time of stacking, etc.

As shown in FIG. 4 to FIG. 6, the first external electrode 12 continuously has a part 12*a* covering one side of the capacitor body 11 in the length direction (left side in FIG. 4 and FIG. 5), a part 12*b* partially covering one side of the capacitor body 11 in the height direction (top side in FIG. 4), a part 12*c* partially covering the other side of the capacitor body 11 in the height direction (bottom side in FIG. 4), a part 12*d* partially covering one side of the capacitor body 11 in the width direction (bottom side in FIG. 5), and a part 12*e* partially covering the other side of the capacitor body 11 in the width direction (top side in FIG. 5). Also with the first external electrode 12, the thicknesses of parts 12*f* close to the ridgelines (four ridgelines) of one side of the capacitor body 11 in the length direction (left side in FIG. 4 and FIG. 5) are greater than the thicknesses of the parts 12*b* to 12*e* (hereinafter referred to as "thick parts 12*f*").

The lengths of the parts 12*b* to 12*e* along the length of the capacitor body 11 are the same based on the design reference lengths including no manufacturing tolerance. In addition, the thicknesses of the parts 12*b* to 12*e* are the same based on the design reference lengths including no manufacturing tolerance.

As shown in FIG. 4 to FIG. 6, the second external electrode 13 continuously has a part 13*a* covering the other side of the capacitor body 11 in the length direction (right side in FIG. 4 and FIG. 5), a part 13*b* partially covering one side of the capacitor body 11 in the height direction (top side in FIG. 4), a part 13*c* partially covering the other side of the capacitor body 11 in the height direction (bottom side in FIG. 4), a part 13*d* partially covering one side of the capacitor body 11 in the width direction (bottom side in FIG. 5), and a part 13*e* partially covering the other side of the capacitor body 11 in the width direction (top side in FIG. 5). Also with the second external electrode 13, the thicknesses of parts 13*f* close to the ridgelines (four ridgelines) of the other side of the capacitor body 11 in the length direction (right side in FIG. 4 and FIG. 5) are greater than the thicknesses of the parts 13*b* to 13*e* (hereinafter referred to as "thick parts 13*f*").

The lengths of the parts 13*b* to 13*e* along the length of the capacitor body 11 are the same based on the design reference lengths including no manufacturing tolerance. In addition, the thicknesses of the parts 13*b* to 13*e* are the same based on the design reference lengths including no manufacturing tolerance.

As shown in FIG. 4 to FIG. 6, the third external electrode 14 continuously has a part 14*a* partially covering one side of the capacitor body 11 in the height direction (top side in FIG. 4 and FIG. 6), a part 14*b* partially covering the other side of the capacitor body 11 in the height direction (bottom side in FIG. 4 and FIG. 6), a part 14c partially covering one side of the capacitor body 11 in the width direction (bottom side in FIG. 5, left side in FIG. 6), and a part 14d partially covering the other side of the capacitor body 11 in the width direction (top side in FIG. 5, right side in FIG. 6). Also with the third external electrode 14, the thicknesses of parts 14e close to the ridgelines (two ridgelines) of one side of the capacitor body 11 in the height direction (top side in FIG. 4 and FIG. 6) and thicknesses of parts 14e close to the ridgelines (two ridgelines) of the other side of the capacitor body 11 in the height direction (bottom side in FIG. 4 and FIG. 6) are greater than the thicknesses of the parts 14a to 14d (hereinafter referred to as "thick parts 14e").

The lengths of the parts 14a to 14d along the length of the capacitor body 11 are the same based on the design reference lengths including no manufacturing tolerance. In addition, the thicknesses of the parts 14a to 14d are the same based on the design reference lengths including no manufacturing tolerance.

It should be noted that the first external electrode 12, second external electrode 13, and third external electrode 14 have a two-layer structure comprising a base film contacting the exterior side of the capacitor body 11 and a surface film contacting the exterior side of this base film, or a multi-layer structure comprising a base film, surface film, and at least one intermediate film in between. The base film is formed by a baked film, for example, and for this baked film, preferably a good conductor whose primary component is nickel, copper, palladium, platinum, silver, gold, or alloy thereof, etc., may be used. The surface film is formed by a plated film, for example, and for this plated film, preferably a good conductor whose primary component is copper, tin, palladium, gold, zinc, or alloy thereof, etc., may be used. The intermediate film is formed by a plated film, for example, and for this plated film, preferably a good conductor whose primary component is platinum, palladium, gold, copper, nickel, or alloy thereof, etc., may be used.

With the aforementioned through-type capacitor 10-1, a length E1 and length E3 meet the condition "E1<E3," and a length E2 and length E3 meet the condition "E2<E3," where E1 represents the length of the first external electrode 12 along the length of the capacitor body 11, E2 represents the length of the second external electrode 13 along the length of the capacitor body 11, and E3 represents the length of the third external electrode 14 along the length of the capacitor body 11, as the through-type capacitor 10-1 is viewed from the height direction, as shown in (A) in FIG. 2. Incidentally, the length E1 and length E2 may be the same or slightly different based on the design reference lengths including no manufacturing tolerance.

The condition "E1<E3" and condition "E2<E3" cited above are effective in "improving the strength at the time of installation," and therefore this effectiveness (effect) is explained below.

The aforementioned through-type capacitor 10-1 is generally picked up in a component feeding area by a pickup nozzle at or near the center of one side or the other side in the height direction (refer to the + mark in (A) in FIG. 2), after which the picked-up capacitor is transferred and then installed on a circuit board, such as a circuit board permitting surface mounting (component mounting board), circuit board permitting surface mounting and internal mounting (component embedding board), or the like.

Since the conventional through-type capacitor 100 shown in FIG. 1 has a structure whereby a load is applied directly to the capacitor body 101 from the pickup nozzle at the time of the installation, there are concerns that this load may cause the capacitor body 101 to generate cracks. On the other hand, the aforementioned through-type capacitor 10-1 has the third external electrode 14 of quadrangular cylinder shape at the center of the capacitor body 11 in the length direction, and also meets the condition "E1<E3" and condition "E2<E3," as cited above, and therefore the load from the pickup nozzle at the time of the installation can be received by the third external electrode 14 and moreover this load can be dispersed to the third external electrode 14 of quadrangular cylinder shape and mitigated, which prevents the capacitor body 11 from generating cracks and improves the strength at the time of installation. Desirably the length E3 of the third external electrode 14 is designed as large as possible because, this way, the aforementioned mitigation action can be achieved more reliably and benefits similar to the foregoing can be obtained even when the contact position of the pickup nozzle with respect to the third external electrode 14 shifts.

Also, as shown in FIG. 7, with the aforementioned through-type capacitor 10-1, a total area TAR, area AR1, area AR2 and area AR3 meet the condition "0.6≤(AR1+AR2+AR3)/TAR≤0.9," where TAR represents the total plane contour area of the through-type capacitor 10-1 as viewed from the height direction, AR1 represents the plane contour area of the first external electrode 12, AR2 represents the plane contour area of the second external electrode 13, and AR3 represents the plane contour area of the third external electrode 14. Incidentally, the area AR1 and area AR2 may be the same or slightly different based on the design reference lengths including no manufacturing tolerance.

The condition "0.6≤(AR1+AR2+AR3)/TAR≤0.9" cited above is effective in "improving the reliability at the time of connection," and therefore this effectiveness (effect) is explained below.

After the aforementioned through-type capacitor 10-1 has been installed on a circuit board, its external electrodes 12 to 14 are electrically connected to conductor pads, etc. To be specific, the external electrodes 12 to 14 are electrically connected to conductor pads using solder in the case of a circuit board that permits surface mounting (component mounting board), while the external electrodes 12 to 14 are electrically connected to conductor pads using solder and also conductor vias are electrically connected to the external electrodes 12 to 14 in the case of a circuit board that permits surface mounting and internal mounting (component embedding board).

Because the conventional through-type capacitor 100 shown in FIG. 1 does not have the third external electrode 14 like the aforementioned through-type capacitor 10-1 has, and also because the occupancy ratio of the total sum of the plane contour areas of the first external electrode 102 through fourth external electrode 105 relative to the plane contour area of the through-type capacitor 100 as viewed from the height direction is around 50%, there are concerns that a slight shifting of the installation position on the circuit board may cause the reliability of electrical connection with the conductor pads and conductor vias to drop. On the other hand, the aforementioned through-type capacitor 10-1 has the third external electrode 14 of quadrangular cylinder shape at the center of the capacitor body 11 in the length direction, and also the occupancy ratio of the total sum of the plane contour areas of the first external electrode 12 through third external electrode 14 relative to the plane contour area of the through-type capacitor 10-1 as viewed from the height direction is 60% or more and the condition "0.6≤(AR1+AR2+AR3)/TAR≤0.9" cited above is met, and therefore desired electrical connections can be achieved properly even if the installation position on the circuit board shifts slightly, and the reliability of connection can be improved as a result.

It should be noted that, in the condition "0.6≤(AR1+ AR2+AR3)/TAR≤0.9" cited above, "0.6" is the lower limit value that considers meeting the condition "E1<E3" and condition "E2<E3" cited above and achieving the aforementioned "improved strength at the time of installation." In addition, "0.9" in the same condition is the upper limit value that considers avoiding shorting of the first external electrode 12 and third external electrode 14 and shorting of the second external electrode 13 and third external electrode 14 when the external electrodes 12 to 14 are electrically connected to the conductor pads or conductor vias.

Furthermore, with the aforementioned through-type capacitor 10-1, the surface roughness of the first external electrode 12, surface roughness of the second external electrode 13, and surface roughness of the third external electrode 14 are greater than the surface roughness of the exposed parts 11a, 11b of the capacitor body 11. Incidentally, the surface roughness of the first external electrode 12 and surface roughness of the second external electrode 13 may be the same or slightly different based on the design reference roughnesses including no manufacturing tolerance.

The roughness relationship cited above is effective in "preventing the separation of sealing resin," and therefore this effectiveness (effect) is explained below.

The aforementioned through-type capacitor 10-1 may be sealed with synthetic resin after having been connected to conductor pads, etc., on a circuit board. Particularly on a circuit board that permits surface mounting and internal mounting (component embedding board), the through-type capacitor 10-1 as internally mounted is almost entirely sealed with synthetic resin to ensure air-tightness.

Since the conventional through-type capacitor 100 shown in FIG. 1 does not have the roughness relationship the aforementioned through-type capacitor 10-1 has, there are concerns that sealing this through-type capacitor 100 with synthetic resin after connection may cause the sealing resin to separate from the external electrodes 102 to 105 for the reason that the adhesive strength of sealing resin with respect to the external electrodes 102 to 105 is weaker than the adhesive strength of sealing resin with respect to the capacitor body 101, in which case corrosion, etc., may result. On the other hand, the aforementioned through-type capacitor 10-1 is such that the surface roughness of the external electrodes 12 to 14 is greater than the surface roughness of the exposed parts 11a, 11b of the capacitor body 11, and therefore the adhesive strength of sealing resin with respect to the external electrodes 12 to 14 can be increased and separation of sealing resin can be prevented as a result.

Additionally, with the aforementioned through-type capacitor 10-1, the thicknesses of the parts (thick parts 12f) of the first external electrode 12 close to the ridgelines of one side of the capacitor body 11 in the length direction are greater than the thicknesses of the parts 12b to 12d, the thicknesses of the parts (thick parts 13f) of the second external electrode 13 close to the ridgelines of the other side of the capacitor body 11 in the length direction are greater than the thicknesses of the parts 13b to 13d, and the thicknesses of the parts (thick parts 14e) of the third external electrode 14 close to the ridgelines of one side of the capacitor body 11 in the height direction and thicknesses of the parts (thick parts 14e) of the third external electrode 14 close to the ridgelines of the other side of the capacitor body 11 in the height direction are greater than the thicknesses of the parts 14a to 14d.

The thickness relationship cited above is effective in "preventing poor connection," and therefore this effectiveness (effect) is explained below.

The aforementioned through-type capacitor 10-1 may be packaged in a tape-type packing material having a component storage concave, and then used. The through-type capacitor 10-1 as packaged in such tape-type packing material is taken out of the component storage concave by a pickup nozzle after the cover tape has been separated from the main tape, and then installed on a circuit board as described earlier.

Since the conventional through-type capacitor 100 shown in FIG. 1 does not have the thickness relationship (concerning the thick parts 12f, 13f and 14e) the aforementioned through-type capacitor 10-1 has, there are concerns that packaging it in a tape-type packing material may cause the surfaces of the external electrodes 102 to 105, especially the surfaces used for electrical connection on both sides in the height direction, to contact the bottom surface of the component storage concave of the tape-type packing material, or the concave closing surface of the cover tape, in which case the resulting friction-induced deterioration, soiling, etc., of these surfaces may lead to poor electrical connections of the external electrodes 102 to 105. With the aforementioned through-type capacitor 10-1, on the other hand, the external electrodes 12 to 14 have the thick parts 12f, 13f, 14e near the ridgelines of the capacitor body 11, and therefore the surfaces of the external electrodes 12 to 14, especially the surfaces used for electrical connection on both sides in the height direction (surfaces of the parts 12b, 12c, 13b, 13c, 14a, 14b) are controlled against contacting the bottom surface of the component storage concave of the tape-type packing material or the concave closing surface of the cover tape to prevent friction-induced deterioration, soiling, etc., of these surfaces, and this prevents poor connections between the external electrodes 12 to 14 and conductor pads or conductor vias as they are electrically connected.

Next, the specifications of the following samples prepared for the purpose of confirming the aforementioned effectivenesses (effects) are explained by using the symbols marked on each drawing as deemed appropriate. Incidentally, the length values mentioned below are all design reference lengths including no manufacturing tolerance.

Evaluation Sample 1 corresponding to the through-type capacitor 10-1 shown in FIG. 2 to FIG. 7

Evaluation Sample 2 corresponding to the conventional through-type capacitor 100 shown in FIG. 1

The specifications of Evaluation Sample 1 are as follows:

The overall length L is 1000 μm, width W is 600 μm, and height H is 220 μm.

The capacitor body 11 has a length of 960 μm, width of 560 μm, and height of 180 μm.

On the capacitor body 11, the thickness of the first protective part PP1 and thickness of the second protective part PP2 are both 30 μm, while the thickness of the capacitive part CP is 120 μm.

In the capacitive part CP, the thickness of the first internal electrode layer 15 and thickness of the second internal electrode layer 16 are both 0.7 μm, and the thickness of the dielectric layer 17 is 0.8 μm, while the number of first internal electrode layers 15 is 40 and the number of second internal electrode layers 16 is 40.

The first protective part PP1, each dielectric layer 17, and second protective part PP2 are made of dielectric ceramics whose primary component is barium titanate, while each first internal electrode layer 15 and each second internal electrode layer 16 are made of a good conductor whose primary component is nickel.

The thickness of the parts 12b to 12e of the first external electrode 12, thickness of the parts 13b to 13e of the second external electrode 13, and thickness of the parts 14a to 14d of the third external electrode 14 are all 15 μm, the thickness of the part 12a of the first external electrode 12 and thickness of the part 13a of the second external electrode 13 are both 20 μm, and the thickness of the thick parts 12f, 13f, 14e of the external electrodes 12 to 14 is 20 μm.

The first external electrode 12, second external electrode 13, and third external electrode 14 all have a two-layer structure comprising a base film whose primary component is nickel and a surface film whose primary component is copper.

The length E1 of the first external electrode 12 and length E2 of the second external electrode 13 are both 200 μm, and the length E3 of the third external electrode 14 is 350 μm.

The surface roughness Ra of the first external electrode 12, surface roughness Ra of the second external electrode 13, and surface roughness Ra of the third external electrode 14 are all 0.31 μm or more, while the surface roughness Ra of the exposed parts 11a, 11b of the capacitor body 11 is 0.08 μm or less.

Here, the manufacturing method of Evaluation Sample 1 is introduced briefly. For the manufacturing, first a ceramic slurry containing barium titanate powder, ethanol (solvent), polyvinyl butyral (binder), and additives such as dispersant is prepared, along with a metal paste containing nickel powder, terpineol (solvent), ethyl cellulose (binder), and additives such as dispersant.

Next, a die-coater, gravure coater, or other coating machine, and a drying machine are used to apply the ceramic slurry on the surface of a carrier film and then dry the film to produce a first green sheet. Also, a screen printer, gravure printer, or other printing machine, and a drying machine are used to print the metal paste on the surface of the first green sheet in matrix or zigzag patterns and then dry the sheet to produce a second green sheet on which first internal electrode layer 15 patterns have been formed, and also print the metal paste on the surface of the first green sheet in matrix or zigzag patterns and then dry the sheet to produce a third green sheet on which second internal electrode layer 16 patterns have been formed.

Next, a movable pickup head with stamping blade and heater or other laminating machine is used to stack together individual sheets that have been stamped out of the first green sheet, until a specified number is reached, and then thermally compress the sheets to produce a part corresponding to the second protective part PP2. Next, a laminating machine similar to the foregoing is used to stack an individual sheet (including the first internal electrode 15 patterns) that has been stamped out of the second green sheet, on top of an individual sheet (including the second internal electrode layer 16 patterns) that has been stamped out of the third green sheet, and then thermally compress the sheets, and this operation is repeated to produce a part corresponding to the capacitive part CP. Next, a laminating machine similar to the foregoing is used to stack together individual sheets that have been stamped out of the first green sheet, until a specified number is reached, and then thermally compress the sheets to produce a part corresponding to the first protective part PP1. Next, a hot hydrostatic press or mechanical or hydraulic press or other final press machine is used to finally thermally compress the aforementioned parts that have been stacked together, to produce an unsintered laminated sheet.

Next, a blade dicer, laser dicer, or other cutting machine is used to cut the unsintered laminated sheet in a lattice form to produce unsintered chips each corresponding to the capacitor body 11. Next, a tunnel-type sintering furnace, box-type sintering furnace, or other sintering machine is used to sinter (including binder removal and sintering) each of the many unsintered chips in a reducing ambience or ambience of low partial oxygen pressure based on a temperature profile appropriate for barium titanate and nickel, to produce the capacitor body 11.

Next, a roller coater, dip coater, or other coating machine, and a drying machine are used to apply the metal paste (the aforementioned metal paste is carried over) at both ends of the capacitor body 11 in the length direction and then dry the paste, followed by baking in an ambience similar to the foregoing to form a base film, as well as electroplating or other plating treatment to form a surface film covering the base film, to produce a first external electrode 12 and second external electrode 13. Also, a coating machine similar to the foregoing and a drying machine are used to apply the metal paste (the aforementioned metal paste is carried over) to the center area of the capacitor body 11 in the length direction and then dry the paste, followed by baking in an ambience similar to the foregoing to form a base film, as well as electroplating or other plating treatment to form a surface film covering the base film, to produce a third external electrode 14. Next, the surfaces of the first external electrode 12, surfaces of the second external electrode 13, and surfaces of the third external electrode 14 are chemically etched to roughen the surfaces.

On the other hand, the specifications of Evaluation Sample 2 are different from the specifications of Evaluation Sample 1 only in the following points. Incidentally, the manufacturing method of Evaluation Sample 2 is the same as the manufacturing method of Evaluation Sample 1 except for the last chemical etching.

The thickness of the first external electrode 102, thickness of the second external electrode 103, thickness of the third external electrode 104, and thickness of the fourth external electrode 105 are all 20 μm.

The length E13 of the third external electrode 104 and length E14 of the fourth external electrode 105 are both 350 μm, while the length E15 of the third external electrode 104 and length E16 of the fourth external electrode 105 are both 150 μm (refer to (A) in FIG. 1 for lengths E13 to E16).

The surface roughness Ra of the first external electrode 102, surface roughness Ra of the second external electrode 103, surface roughness Ra of the third external electrode 104, and surface roughness Ra of the fourth external electrode 105 are all 0.06 μm or less, while the surface roughness Ra of the exposed parts of the capacitor body 101 is 0.08 μm or less.

Next, the results of confirming the aforementioned effectivenesses (effects) using Evaluation Samples 1 and 2 mentioned above are explained, among others.

Evaluation Sample 1 meets the condition "E1<E3" and condition "E2<E3" because the length E1 of the first external electrode 12 and length E2 of the second external electrode 13 are both 200 μm, while the length E3 of the third external electrode 14 is 350 μm. On the other hand, Evaluation Sample 2 meets neither of the aforementioned two conditions because, unlike Evaluation Sample 1, it does not have the third external electrode 14 of quadrangular cylinder shape. When a total of five evaluation samples 1 were measured for flexural strength and a total of five evaluation samples 2 were also measured for flexural strength, the evaluation samples 1 had a flexural strength of 180 gf or more, while the evaluation samples 2 had a flexural strength of 110 gf or less. Based on this, it can be said that Evaluation Sample 1 corresponding to the through-type capacitor 10-1 shown in FIG. 2 to FIG. 7 is effective in "improving the strength at the time of installation" compared to Evaluation Sample 2 corresponding to the conventional through-type capacitor 100 shown in FIG. 1.

Also, Evaluation Sample 1 meets the condition "0.6≤(AR1+AR2+AR3)/TAR≤0.9" because the calculated value (average of total five samples) of (Plane contour area AR1 of first external electrode 12+Plane contour area AR2 of second external electrode 13+Plane contour area AR3 of third external electrode 14)/(Total plane contour area TAR of Evaluation Sample 1), as measured when Evaluation Sample 1 is viewed from the height direction, is 0.77. On the other hand, Evaluation Sample 2 does not meet the aforementioned condition because the calculated value (average of five samples) of (Plane contour area of first external electrode 102+Plane contour area of second external electrode 103+Plane contour area of third external electrode 104+Plane contour area of fourth external electrode 105)/(Total plane contour area of Evaluation Sample 2), as measured when Evaluation Sample 2 is viewed from the height direction, is 0.50. Based on this, it can be said that Evaluation Sample 1 corresponding to the through-type capacitor 10-1 shown in FIG. 2 to FIG. 7 is effective in "improving the reliability at the time of connection" compared to Evaluation Sample 2 corresponding to the conventional through-type capacitor 100 shown in FIG. 1.

Furthermore, Evaluation Sample 1 meets the roughness relationship of the surface roughnesses of the first external electrode 12, second external electrode 13, and third external electrode 14 being greater than the surface roughness of the exposed parts of the capacitor body 11, because the surface roughness Ra of the first external electrode 12, surface roughness Ra of the second external electrode 13, and surface roughness Ra of the third external electrode 14 are all 0.31 µm or more, while the surface roughness Ra of the exposed parts 11a, 11b of the capacitor body 11 is 0.08 µm or less. On the other hand, Evaluation Sample 2 does not meet the aforementioned roughness relationship because the surface roughness Ra of the first external electrode 102, surface roughness Ra of the second external electrode 103, surface roughness Ra of the third external electrode 104, and surface roughness Ra of the fourth external electrode 105 are all 0.06 µm or less, while the surface roughness Ra of the exposed parts of the capacitor body 101 is 0.08 µm or less. Based on this, it can be said that Evaluation Sample 1 corresponding to the through-type capacitor 10-1 shown in FIG. 2 to FIG. 7 is effective in "preventing the separation of sealing resin" compared to Evaluation Sample 2 corresponding to the conventional through-type capacitor 100 shown in FIG. 1.

Furthermore, with Evaluation Sample 1, the thickness of the parts 12b to 12e of the first external electrode 12, thickness of the parts 13b to 13e of the second external electrode 13, and thickness of the parts 14a to 14d of the third external electrode 14 are all 15 µm, while the thickness of the thick parts 12f, 13f, 14e of the external electrodes 12 to 14 is 20 µm, producing a gap of 5 µm between the two groups of parts. This means that, even when Evaluation Sample 1 is packaged in a tape-type packing material having a component storage concave, the surfaces of the external electrodes 102 to 105, especially the surfaces used for electrical connection on both sides in the height direction, do not easily contact the bottom surface of the component storage concave of the tape-type packing material or the concave closing surface of the cover tape. On the other hand, Evaluation Sample 2 does not have the gap Evaluation Sample 1 has. For this reason, packaging Evaluation Sample 2 in a tape-type packing material having a component storage concave causes the surfaces of the external electrodes 102 to 105, especially the surfaces used for solder connection or via connection on both sides in the height direction, to contact the interior surface of the component storage concave of the tape-type packing material or the concave closing surface of the cover tape, thus making it easy for these surfaces to suffer friction-induced deterioration, soiling, etc. Based on this, it can be said that Evaluation Sample 1 corresponding to the through-type capacitor 10-1 shown in FIG. 2 to FIG. 7 is effective in "preventing poor connection" compared to Evaluation Sample 2 corresponding to the conventional through-type capacitor 100 shown in FIG. 1.

<Variation Examples of First Embodiment>

1) With the aforementioned through-type capacitor 10-1 (including Evaluation Sample 1) shown, the maximum thickness of both sides of the first external electrode 12 in the height direction (thickness of the thick part 12f), maximum thickness of both sides of the second external electrode 13 in the height direction (thickness of the thick part 13f), and maximum thickness of both sides of the third external electrode 14 in the height direction (thickness of the thick part 14e) were roughly the same; however, making the maximum thickness of both sides of the third external electrode 14 in the height direction smaller than the maximum thickness of both sides of the first external electrode 12 in the height direction and maximum thickness of both sides of the second external electrode 13 in the height direction is effective in "improving the stability" of the through-type capacitor 10-1 after it has been installed on a circuit board.

This means that, with the aforementioned through-type capacitor 10-1, there are concerns that the through-type capacitor 10-1 installed on a circuit board may tilt or its first external electrode 12 or second external electrode 13 may separate and thereby negatively affect the electrical connections to be made subsequently, if the maximum thickness of both sides of the third external electrode 14 in the height direction becomes greater than the maximum thickness of both sides of the first external electrode 12 in the height direction and maximum thickness of both sides of the second external electrode 13 in the height direction. However, the foregoing tilting or separation can be prevented to achieve the effect of "improving the stability" as mentioned above, if the maximum thickness T1max and maximum thickness T3max meet the condition "T1max>T3max," while the maximum thickness T2max and maximum thickness T3max meet the condition "T2max>T3max," where T1max represents the maximum thickness of both sides of the first external electrode 12 in the height direction, T2max represents the maximum thickness of both sides of the second external electrode 13 in the height direction, and T3max represents the maximum thickness of both sides of the third external electrode 14 in the height direction.

2) With the aforementioned through-type capacitor 10-1 (including Evaluation Sample 1) shown, no specific interspace limitation was set for the exposed parts 11a, 11b of the capacitor body 11; however, specifying the interspaces to be created by these exposed parts 11a, 11b based on the average thickness of both sides of the third external electrode 14 in the height direction is effective in "preventing shorting" as a result of ion migration.

Specifically, with the aforementioned through-type capacitor 10-1 whose third external electrode 14 has a quadrangular cylinder shape and whose sides in the height direction both have a wide area, there are concerns that increasing the average thickness of these two sides in the height direction may result in a concentration gradient and the consequent phenomenon of metal ions migrating from the third external electrode 14 to the first external electrode 12 and second external electrode 13 via the ceramic body 11 (ion migration), thereby causing the third external electrode 14 to short to the first external electrode 12 and second external electrode 13. However, the foregoing ion migration can be controlled to achieve the effect of "preventing shorting" as mentioned above, if the average thickness T3ave and interspace I1 meet the condition "T3ave≤I1/2," while the average thickness T3ave and interspace I2 meet the condition "T3ave≤I2/2," where T3ave represents the average thickness of both sides of the third external electrode 14 in the height direction, I1 represents the interspace created by the exposed part 11a of the capacitor body 11, and I2 represents the interspace created by the exposed part 11b of the capacitor body 11 (refer to (A) in FIG. 2 for I1 and I2).

To confirm the effectiveness (effect) pertaining to "preventing shorting" above, Sample A1 corresponding to Evaluation Sample 1 above except that its interspace I1 and interspace I2 were both set to 40 μm by increasing the length E1 of the third external electrode 14 while its average thickness T3ave of both sides of the third external electrode 14 in the height direction was set to 17.5 μm according to Evaluation Sample 1 above, Sample A2 corresponding to Sample A1 except that its average thickness T3ave of both sides of the third external electrode 14 in the height direction was set to 20 μm, and Sample A3 corresponding to Sample A1 except that its average thickness T3ave of both sides of the third external electrode 14 in the height direction was set to 22.5 μm, were prepared. Then, 100 of each of Samples A1 to A3 were left for 500 hours in an ambience of 85° C. and 85% humidity, after which a high-resistance meter (4329A manufactured by Agilent) was used to check the shorting ratio of the third external electrode 14 and first external electrode 12 as well as the shorting ratio of the third external electrode 14 and second external electrode 13, the result of which was a 0% shorting ratio for Sample A1, 0% shorting ratio for Sample A2, and 5% shorting ratio for Sample A3. In other words, it was confirmed that Samples A1 and A2 meeting the condition "T3ave≤I1/2" and condition "T3ave<I2/2" cited above are effective in "preventing shorting" as mentioned above compared to Sample A3 not meeting the same conditions.

3) With the aforementioned through-type capacitor 10-1 (including Evaluation Sample 1) shown, no specific interspace limitation was set for the exposed parts 11a and 11b of the capacitor body 11; however, specifying the interspaces to be created by these exposed parts 11a and 11b based on the length L1 of the through-type capacitor 10-1 is effective in "reducing the ESL (equivalent series inductance)."

To be specific, with the aforementioned through-type capacitor 10-1, the ESL increases as the virtual distance of electrical current between the first internal electrode layer 15 and second internal electrode layer 16 increases. However, "reducing the ESL" as mentioned above is possible if the interspace I1 and length L1 meet the condition "I1≤0.15×L1," while the interspace I2 and length L1 meet the condition "I2≤0.15×L1," where L1 represents the length of the through-type capacitor 10-1, and I1 represents the interspace created by the exposed part 11a while I2 represents the interspace created by the exposed part 11b, of the capacitor body 11 (refer to (A) in FIG. 2 for L1, I1 and I2). Incidentally, the interspace I1 and interspace I2 may be the same or slightly different based on the design reference lengths including no manufacturing tolerance.

To confirm the effectiveness (effect) pertaining to "reducing the ESL" above, Sample B1 identical to Evaluation Sample 1 above (whose length L1 was 1000 μm and interspaces I1 and I2 were both 125 μm), Sample B2 corresponding to Sample B1 except that the length E1 of the third external electrode 14 was reduced to change both interspace I1 and interspace I2 to 150 μm, and Sample B3 corresponding to Sample B1 except that the length E1 of the third external electrode 14 was reduced to change both interspace I1 and interspace I2 to 175 μm, were prepared. Then, when a network analyzer (8753D manufactured by Agilent) was used to check the ESL values of 100 of each of Samples B1 to B3, the ESL value (average) of Sample B1 was 15 pF, ESL value (average) of Sample B2 was 18 pF, and ESL value (average) of Sample B3 was 20 pF. In other words, it was confirmed that Samples B1 and B2 meeting the condition "I1≤0.15×L1" and condition "I2≤0.15×L1" cited above are effective in "reducing the ESL" as mentioned above compared to Sample B3 not meeting the same conditions. <<Second Embodiment>>

First, the structure, effects, etc., of a through-type multilayer ceramic capacitor 10-2 (hereinafter simply referred to as "through-type capacitor 10-2") pertaining to the second embodiment of the present invention are explained using FIG. 8 to FIG. 11.

This through-type capacitor 10-2 is structurally different from the aforementioned through-type capacitor 10-1 in that, in place of the first internal electrode layer 15 shown in (A) in FIG. 3, a first internal electrode layer 18 of different shape (refer to (A) in FIG. 9) is used. It is structurally identical to the aforementioned through-type capacitor 10-1 except for this difference, and its effects are equivalent to the effects achieved by the aforementioned through-type capacitor 10-1 except for the effects achieved based on this difference, and therefore these identical explanations are skipped.

Each first internal electrode layer 18 has an "I" shape as shown in (A) in FIG. 9 and integrally has narrow leader parts 18a extending in the width direction at one end (left end in (A) in FIG. 9) in the length direction on both sides (top and bottom sides in (A) in FIG. 9) in the width direction, and also at the other end (right end in (A) in FIG. 9) in the length direction on both sides (top and bottom sides in (A) in FIG. 9) in the width direction. The leader parts 18a of each first internal electrode layer 18 extend in the width direction just like leader parts 16a of a second internal electrode layer 16, which means that, as is evident from FIG. 10, projecting the first internal electrode layer 18 and second internal electrode layer 16 in parallel onto one side of the capacitor body 10 in the height direction forms an interspace I3 between the bottom left leader part 18a and bottom center leader part 16a, and also between the top left leader part 18a and top center leader part 16a in FIG. 10, while forming an interspace I4 between the bottom right leader part 18a and bottom center leader part 16a, and also between the top right leader part 18a and top center leader part 16a in FIG. 10.

As is evident from FIG. 11, one end of each first internal electrode layer 18 in the length direction, or specifically the bottom edge and top edge of the bottom left and top left leader parts 18a in (A) in FIG. 9, are electrically connected to the part 12d and part 12e of the first external electrode 12, respectively, while the other end of each first internal electrode layer 18 in the length direction, or specifically the bottom edge and top edge of the two right leader parts 18a in (A) in FIG. 9, are electrically connected to the part 13d and part 13e of the second external electrode 13, respectively.

With the aforementioned through-type capacitor 10-2, as shown in FIG. 10, the interspace I3 and length L2 meet the condition "I3≤0.35×L2," while the interspace I4 and length L2 meet the condition "I4≤0.35×L2," where L2 represents the length of the capacitor body 11, and I3 represents the interspace between one leader part 18a of the first internal electrode layer 18 in the length direction and leader part 16a of the second internal electrode layer 16, while I4 represents the interspace between the other leader part 18a of the first internal electrode layer 18 in the length direction and leader part 16a of the second internal electrode layer 16, as projected in parallel onto one side of the capacitor body 11 in the height direction. Incidentally, the interspace I3 and interspace I4 may be the same or slightly different based on the design reference lengths including no manufacturing tolerance The condition "I3≤0.35×L2" and condition "I4≤0.35×L2" cited above are effective in "reducing the ESL (equivalent series inductance)." In other words, with the aforementioned through-type capacitor 10-2, the ESL increases as the virtual distance of electrical current between the first internal electrode layer 18 and second internal electrode layer 16 increases. However, "reducing the ESL" as mentioned above is possible so long as the condition "I3≤0.35×L2" and condition "I4≤0.35×L2" cited above are met.

To confirm the effectiveness (effect) pertaining to "reducing the ESL" here, Sample C1 corresponding to Evaluation Sample 1 above (whose length L2 is 960 µm) except that its first internal electrode layer 15 was changed to the first internal electrode layer 18 shown in (A) in FIG. 9 and the positions of the leader parts 18a were also changed so that the interspace I3 and interspace I4 became 306 µm, Sample C2 corresponding to Sample C1 except that the positions of the leader parts 18a of the first internal electrode layer 18 were changed so that the interspace I3 and interspace I4 became 336 µm, and Sample C3 corresponding to Sample C1 except that the positions of the leader parts 18a of the first internal electrode layer 18 were changed so that the interspace I3 and interspace I4 became 366 µm, were prepared. Incidentally, the leader parts 18a, 16a in Samples C1 to C3 all have a width (length along the direction of length L2 in FIG. 10) of 90 µm. Then, when a network analyzer (8753D manufactured by Agilent) was used to check the ESL values of 100 of each of Samples C1 to C3, the ESL value (average) of Sample C1 was 13 pF, ESL value (average) of Sample C2 was 15 pF, and ESL value (average) of Sample C3 was 17 pF. In other words, it was confirmed that Samples C1 and C2 meeting the condition "I3≤0.35× L2" and condition "I4≤0.35×L2" cited above are effective in "reducing the ESL" as mentioned above compared to Sample C3 not meeting the same conditions.

<Variation Examples of Second Embodiment>

1) The aforementioned through-type capacitor 10-2 (including Samples C1 and C2) used the first internal electrode layer 18 shown in (A) in FIG. 9; however, a first internal electrode layer 19 shown in (A) in FIG. 12 can be used in place of this first internal electrode layer 18. As shown in (B) in FIG. 12, this first internal electrode layer 19 is different in shape from the first internal electrode layer 18 shown in (A) in FIG. 9 in that it has a length spanning from one end in the length direction to the other end in the length direction of the capacitor body 11. Even when this first internal electrode layer 19 is used, as is evident from (B) in FIG. 12, projecting the first internal electrode layer 19 and second internal electrode layer 16 in parallel onto one side of the capacitor body 10 in the height direction forms the interspace I3 between the bottom left leader part 19a and bottom center leader part 16a and also between the top left leader part 19a and top center leader part 16a in (B) in FIG. 12, while forming the interspace I4 between the bottom right leader part 19a and bottom center leader part 16a and also between the top right leader part 19a and top center leader part 16a in (B) in FIG. 12.

2) The aforementioned through-type capacitor 10-2 (including Samples C1 and C2) can adopt the conditions explained under (1) to (3) in <Variation Examples of First Embodiment> above, or specifically the conditions "T1max>T3max" and "T2 max>T3 max," conditions "T3ave≤I1/2" and "T3ave≤I2/2," and conditions "I1≤0.15× L1" and "I2≤0.15×L1," as deemed appropriate, and still achieve similar effects.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2014-265701, filed Dec. 26, 2014, and No. 2015-203774, filed Oct. 15, 2015, each disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A ready-to-use through-type multilayer ceramic capacitor comprising a capacitor body of roughly rectangular solid shape specified by length, width, and height, as well as a capacitive part provided therein which is formed by multiple first internal electrode layers and multiple second internal electrode layers stacked together alternately in a height direction with dielectric layers in between, said through-type multilayer ceramic capacitor further having:

(1) a first external electrode provided on one end of the capacitor body in a length direction in a manner continuously covering one side in the length direction, parts of both sides in the height direction, and parts of both sides in a width direction, of the capacitor body, and to which one ends of the multiple first external electrode layers are connected;

(2) a second external electrode provided on the other end of the capacitor body in the length direction in a manner continuously covering the other side in the length direction, parts of both sides in the height direction, and parts of both sides in the width direction, of the capacitor body, and to which the other ends of the multiple first external electrode layers are connected; and (3) a third external electrode of quadrangular cylinder shape provided at a center of the capacitor body in the length direction in a manner continuously covering parts of both sides in the height direction and parts of both sides in the width direction, of the capacitor body, in a state not contacting the first external electrode and second external electrode, where one ends of the multiple second electrode layers in the width direction are connected to one part, while the other ends of the multiple second internal electrode layers in the width direction are connected to the other part, of the area covering parts of both sides in the width direction; and (4) lengths E1 and E3 meet a condition "E1 <E3," while lengths E2 and E3 meet a condition "E 2 <E3," where E1 represents a length of the first external electrode along a length of the capacitor body, E2 represents a length of the second external electrode along the length of the capacitor body, and E3 represents a length of the third external electrode along the length of the capacitor body, as the through-type multilayer ceramic capacitor is viewed from the height direction wherein the first external electrode has a part near a ridgeline connecting one side of the capacitor body in the length direction and one side of the capacitor body in the height direction and a part near a ridgeline connecting the one side of the capacitor body in the length direction and the other side of the capacitor body in the height direction, wherein both parts near the ridgelines have a height, as measured along the height direction away from the capacitor body, greater than a height of all remaining parts of the first external electrode formed on the sides of the capacitor body in the height direction;

the second external electrode has a part near a ridgeline connecting the other side of the capacitor body in the length direction and one side of the capacitor body in the height direction and a part near a ridgeline connecting the other side of the capacitor body in the length direction and the other side of the capacitor body in the height direction, wherein both parts near the ridgelines have a height, as measured along the height direction away from the capacitor body, greater than a height of all remaining parts of the second external electrode formed on the sides of the capacitor body in the height direction; and the third external electrode has parts near ridgelines of one side of the capacitor body in the height direction and parts near ridgelines of the other side of the capacitor body in the height direction whose heights are greater than heights of all remaining parts of the third external electrode as measured along the height direction away from the capacitor body.

2. A through-type multilayer ceramic capacitor according to claim 1, wherein a total area TAR, area AR1, area AR2, and area AR3 meet a condition "0.6<(AR1 +AR2 +AR3) / TAR <0.9," where TAR represents a total plane contour area of the through-type capacitor as viewed from the height direction, AR1 represents a plane contour area of the first external electrode, AR2 represents a plane contour area of the second external electrode, and AR3 represents a plane contour area of the third external electrode.

3. A through-type multilayer ceramic capacitor according to claim 1, wherein:

of both sides in the height direction and both sides in the width direction, of the capacitor body, a part between the first external electrode and the third external electrode, and a part between the second external electrode and the third external electrode, are exposed; and a surface roughness of the first external electrode, surface roughness of the second external electrode, and surface roughness of the third external electrode are all greater than a surface roughness of the exposed parts of the capacitor body.

4. A through-type multilayer ceramic capacitor according to claim 2, wherein:

of both sides in the height direction and both sides in the width direction, of the capacitor body, a part between the first external electrode and the third external electrode, and a part between the second external electrode and the third external electrode, are exposed; and a surface roughness of the first external electrode, surface roughness of the second external electrode, and surface roughness of the third external electrode are all greater than a surface roughness of the exposed parts of the capacitor body.

5. A through-type multilayer ceramic capacitor according to claim 1, wherein a height of the through-type multilayer ceramic capacitor is 250 μm or less.

6. A through-type multilayer ceramic capacitor according to claim 2, wherein a height of the through-type multilayer ceramic capacitor is 250 μm or less.

7. A through-type multilayer ceramic capacitor according to claim 3, wherein a height of the through-type multilayer ceramic capacitor is 250 μm or less.

8. A through-type multilayer ceramic capacitor according to claim 1, wherein a maximum thickness T1max and maximum thickness T3max meet a condition "T1max >T3max," while a maximum thickness T2max and maximum thickness T3max meet a condition "T2max >T3max," where T1max represents a maximum thickness of both sides of the first external electrode in the height direction, T2max represents a maximum thickness of both sides of the second external electrode in the height direction, and T3max represents a maximum thickness of both sides of the third external electrode in the height direction.

9. A through-type multilayer ceramic capacitor according to claim 2, wherein a maximum thickness T1max and maximum thickness T3max meet a condition "T1max >T3max," while a maximum thickness T2max and maximum thickness T3max meet a condition "T2max >T3max," where T1max represents a maximum thickness of both sides of the first external electrode in the height direction, T2max represents a maximum thickness of both sides of the second external electrode in the height direction, and T3max represents a maximum thickness of both sides of the third external electrode in the height direction.

10. A through-type multilayer ceramic capacitor according to claim 3, wherein a maximum thickness T1max and maximum thickness T3max meet a condition "T1max >T3max," while a maximum thickness T2max and maximum thickness T3max meet a condition "T2max >T3max," where T1max represents a maximum thickness of both sides of the first external electrode in the height direction, T2max represents a maximum thickness of both sides of the second external electrode in the height direction, and T3max represents a maximum thickness of both sides of the third external electrode in the height direction.

11. A through-type multilayer ceramic capacitor according to claim 4, wherein a maximum thickness T1max and maximum thickness T3max meet a condition "T1max >T3max," while a maximum thickness T2max and maximum thickness T3max meet a condition "T2max >T3max," where T1max represents a maximum thickness of both sides of the first external electrode in the height direction, T2max represents a maximum thickness of both sides of the second external electrode in the height direction, and T3max represents a maximum thickness of both sides of the third external electrode in the height direction.

12. A through-type multilayer ceramic capacitor according to claim 1, wherein:
of both sides in the height direction and both sides in the width direction, of the capacitor body, a part between the first external electrode and the third external electrode, and a part between the second external electrode and the third external electrode, are exposed; and
an average thickness T3ave and interspace I1 meet a condition "T3ave <I1/2," while an average thickness T3ave and interspace I2 meet a condition "T3ave <I2/2," where T3ave represents an average thickness of both sides of the third external electrode in the height direction, I1 represents an interspace created by the exposed part of the capacitor body between the first external electrode and third external electrode, and I2 represents an interspace created by the exposed part of the capacitor body between the second external electrode and third external electrode.

13. A through-type multilayer ceramic capacitor according to claim 1, wherein:
of both sides in the height direction and both sides in the width direction, of the capacitor body, a part between the first external electrode and the third external electrode, and a part between the second external electrode and the third external electrode, are exposed; and
an interspace I1 and length L1 meet the condition "I1 <0.15 x L1," while the interspace I2 and length L1 meet a condition "I2 <0.15 x L1," where L1 represents a length of the through-type capacitor, I1 represents an interspace created by the exposed part of the capacitor body between the first external electrode and third external electrode, and I2 represents an interspace created by the exposed part of the capacitor body between the second external electrode and third external electrode.

14. A through-type multilayer ceramic capacitor according to claim 1, wherein the multiple first internal electrodes are shaped to have narrow leader parts extending in the length direction at both ends in the length direction, while the multiple second internal electrodes are shaped to have narrow leader parts extending in the width direction at both ends in the width direction.

15. A through-type multilayer ceramic capacitor according to claim 1, wherein the multiple first internal electrodes are shaped to have narrow leader parts extending in the width direction at both ends in the length direction on both sides in the width direction, while the multiple second internal electrodes are shaped to have narrow leader parts extending in the width direction at both ends in the width direction.

16. A through-type multilayer ceramic capacitor according to claim 7, wherein an interspace I3 and length L2 meet a condition "I3 <0.35 x L2," while an interspace I4 and length L2 meet a condition "I4 <0.15 x L2," where L2 represents a length of the capacitor body and I3 represents an interspace between one leader part of any of the multiple first internal electrode layers in the length direction and leader part of any of the multiple second internal electrode layers, while I4 represents an interspace between the other leader part of any of the multiple first internal electrode layers in the length direction and leader part of any of the multiple second internal electrode layers, as projected in parallel onto one side of the capacitor body in the height direction.

17. A through-type multilayer ceramic capacitor according to claim 1, wherein the parts of the third external electrode near the ridgelines of the one side of the capacitor body in the height direction and the parts of the third external electrode near the ridgelines of the other side of the capacitor body in the height direction protrude further in a width direction away from the capacitor body with reference to all remaining parts of the third external electrode formed on the sides of the capacitor body in the width direction.

* * * * *